United States Patent [19]
Rogers

[11] Patent Number: 5,727,381
[45] Date of Patent: Mar. 17, 1998

[54] DUCT FLOW CONTROL SYSTEM

[75] Inventor: Ernest O. Rogers, Great Falls, Va.

[73] Assignee: The United States of America as represented by Secretary of the Navy, Washington, D.C.

[21] Appl. No.: 802,701

[22] Filed: Feb. 19, 1997

[51] Int. Cl.⁶ .......................... B63H 25/46; B64C 15/14
[52] U.S. Cl. .................... 60/231; 415/211.2; 415/221; 415/222; 415/914; 416/93 A; 416/189; 114/151; 244/52; 239/265.17; 239/265.25; 239/DIG. 7; 440/67
[58] Field of Search ................ 415/211.2, 219.1, 415/220, 221, 222, 914; 416/93 R, 93 A, 94, 189; 60/230, 231; 440/67; 114/150, 151, 162, 278; 244/52, 207; 239/265.11, 265.17, 265.19, 265.25, DIG. 1-7

[56] References Cited

U.S. PATENT DOCUMENTS

| | | | |
|---|---|---|---|
| 3,022,026 | 2/1962 | Shaw | 60/231 |
| 3,221,498 | 12/1965 | Bankston | 244/52 |
| 3,229,461 | 1/1966 | Jones | 244/52 |
| 3,288,373 | 11/1966 | Pike | 244/52 |
| 3,675,424 | 7/1972 | Oosterveld | 114/151 |
| 5,464,321 | 11/1995 | Williams et al. | 416/93 A |

FOREIGN PATENT DOCUMENTS

| | | | |
|---|---|---|---|
| 353631 | 5/1961 | France | 60/231 |
| 822299 | 10/1959 | United Kingdom | 239/265.17 |

*Primary Examiner*—Christopher Verdier
*Attorney, Agent, or Firm*—John Forrest; Jacob Shuster

[57] ABSTRACT

A duct fixed to a vehicle propelled through an ambient fluid medium is internally provided with spaced channel passages from which the fluid medium is ejected under pressure tangentially of local duct surfaces through Coanda affected slots at the trailing edge of the duct from which only the ejection of the fluid medium occurs. The supply of the pressurized fluid medium under selective control is limited to different angular segments of the channel passages in order to modify the flow stream through the duct so as to perform certain functions such as thrust control and steerage control effects enhancing vehicle maneuverability.

3 Claims, 3 Drawing Sheets

DUCT FLOW CONTROL SYSTEM

The present invention relates in general to flow stream control through ducts, conduits or nozzles.

BACKGROUND OF THE INVENTION

Marine vessels including seagoing ships and underwater vehicles as well as some aircraft incorporate flow stream ducts which sometimes form propeller enclosing shrouds to improve propulsive efficiency. In regard to the use of propellers for propulsion of marine vessels, forward and reverse thrust is provided by ejection of pressurized fluid from Coanda surfaces at the trailing edges of the rotating propeller blades according to U.S. Pat. No. 5,464,321 to Williams et al. As to steerage control during propulsion, the use of rudder-like parts or a movable duct on a propeller was heretofore deemed necessary in association with propulsion systems having nozzle ducts or propeller shrouds. The use of flow slot suction and jet emission at a trailing edge of a nozzle having an interior propeller is on the other hand proposed for steerage control purposes in U.S. Pat. No. 3,675,425 to Oosterveld.

It is therefore an important object of the present invention to provide various flow control functions, such as reversible thrust and steerage control during propulsion of marine vessels or aircraft, without use of displaceable rudder-like parts or performance of dynamic functions associated therewith.

SUMMARY OF THE INVENTION

In accordance with one embodiment of the present invention, a duct fixed to a marine vessel or aircraft through which flow of ambient fluid is conducted during propulsion, is provided with internal channel passages through which pressurized ambient fluid is ejected tangentially from trailing edge portion surfaces of the duct within Coanda affected ejection flow slots from which fluid ejection occurs in an outflow direction only. Such channel passages are connected to a pressurized source of the ambient fluid under selective control for asymmetrical supply of the pressurized fluid to different combinations of angularly spaced segments of the channel passages. Both reversible thrust and steerage control effects are thereby achieved in response to modification of the ambient fluid flow stream within boundary zones along the surfaces of the duct. Also pursuant to the present invention, the ejection flow slots orientated for tangential outflow of fluid perform a re-energizing function for boundary layer flow developed upstream on the duct surface as a result of surface friction. A Coanda formation at the trailing edge separating radially outer and inner ejection flow slots is utilized to effectively entrain boundary layer flow for maximum influence on asymmetric control.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
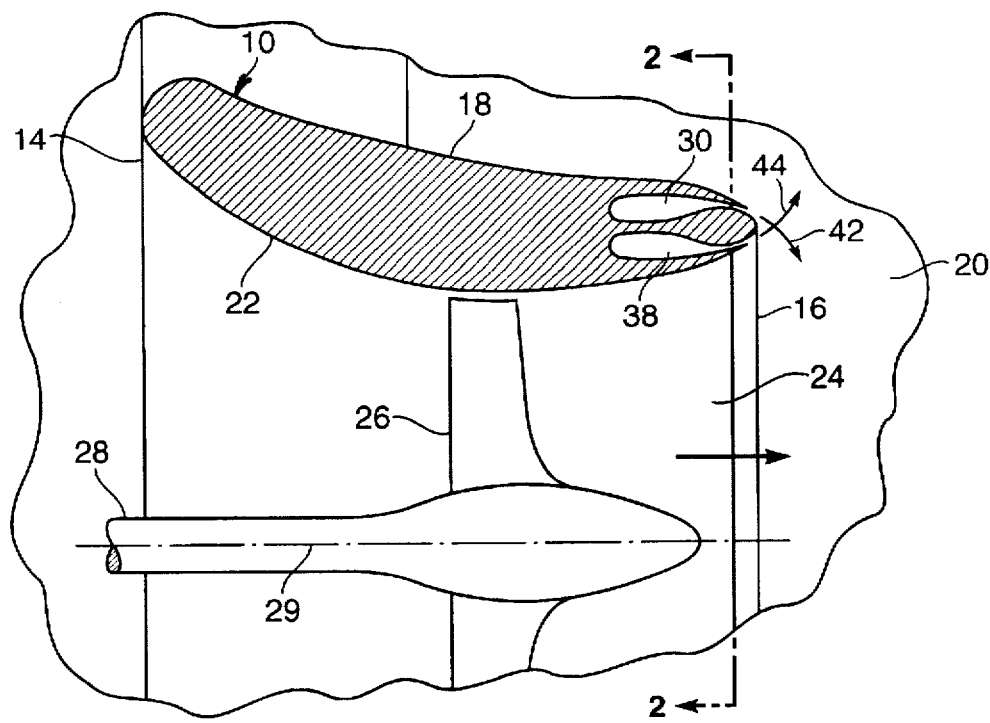
FIG. 1 is a partial side section view through a propeller shrouding duct associated with a vehicle during propulsion through an ambient fluid medium, in accordance with one embodiment of the invention.
Figure 2:
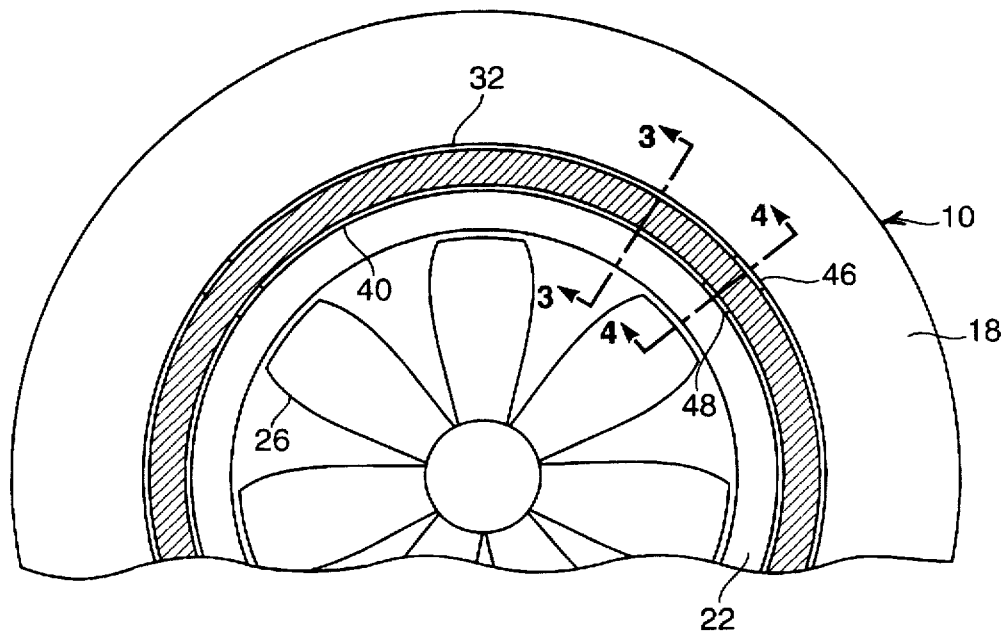
FIG. 2 is a transverse section view taken substantially through a plane indicated by section line 2—2 in FIG. 1.

Referring now to the drawings in detail, FIGS. 1 and 2 illustrate a flow-through duct, generally referred to by reference numeral 10, formed by a fixed annular body 12 extending between a circular forward edge 14 and a rear circular trailing edge 16. Such duct body 12 has a radially outer curved surface 18 externally exposed to an ambient fluid medium 20. The duct body 12 also has a radially inner curved surface 22 enclosing a passage 24 through which flow of the fluid medium 20 is conducted. Such flow of the fluid medium occurs for example during forward motion or propulsion of a vehicle on which the duct 10 is fixedly mounted.

According to one embodiment of the invention, the vehicle is propelled by a power driven bladed propeller 26 within the duct 10. The propeller 26 is fixed to a propeller shaft 28 aligned with the axis 29 of the duct and extending into the flow passage 24 within which the propeller is axially positioned as shown in FIG. 1. The duct 10 thus forms a shroud for such propeller 26 through which forward motion of the vehicle is induced and/or flow of the fluid medium 20 through the duct 10 is accelerated. The vehicle may be a marine vessel in which case the ambient medium is sea water, or an aircraft in which case the ambient medium is atmospheric air. In either case, the duct 10 is a non-rotating part of the propulsion system through which braking and steerage functions are performed as hereinafter explained.

Figure 3:
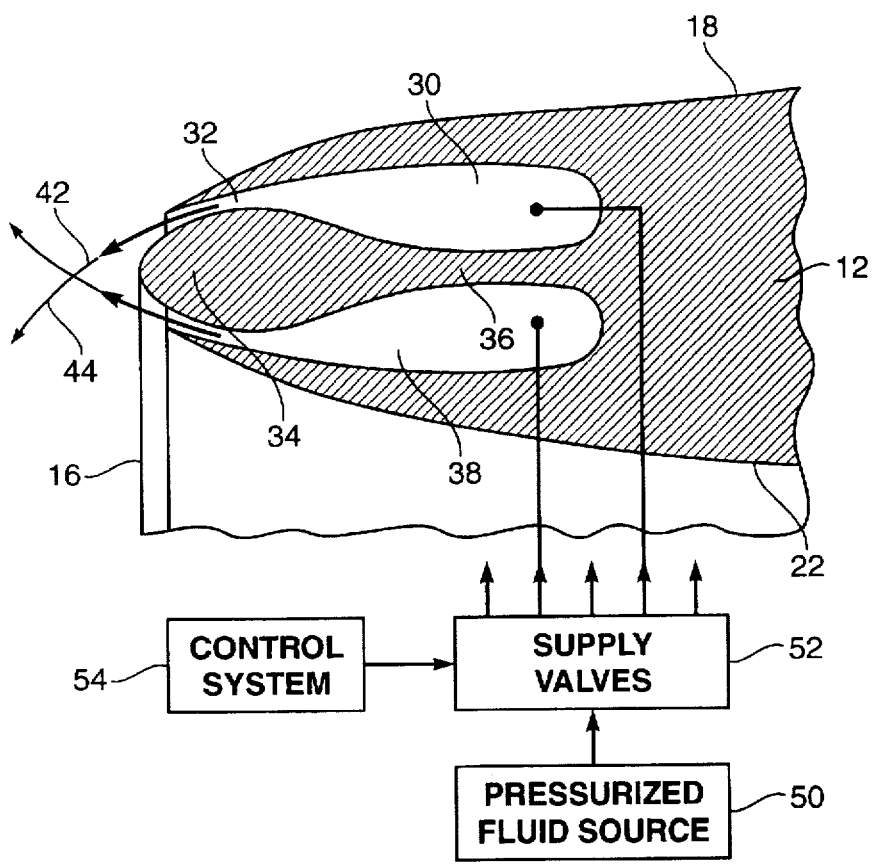
FIG. 3 is a partial section view taken substantially through a plane indicated by section line 3—3 in FIG. 2, with certain associated components diagrammatically illustrated.

Referring now to FIGS. 1–4, the duct body 12 is internally formed adjacent to its trailing edge 16 with a circular arrangement of radially outer channels 30 which extend rearwardly into downwardly curved ejection slot passages 32 underlying that portion of the outer duct body surface 18 approaching the trailing edge 16 from which a Coanda formation 34 projects. An internal wall portion 36 of the duct body 12, to which the Coanda formation 34 is connected, separates the channels 30 from an another circular arrangement of radially inner channels 38 from which upwardly curved ejection slot passages 40 extend along the radially inner surface 22 of the duct body. The slot passages 32 and 40 terminate in spaced adjacency to the trailing edge 16 so that pressurized fluid supplied to the channels 30 and 38 is ejected tangentially as wall surface jets 42 and/or 44 respectively deflected toward opposite sides of the Coanda formation 34 along intersecting paths in an outflow direction only as shown in FIGS. 1 and 3.

Figure 4:
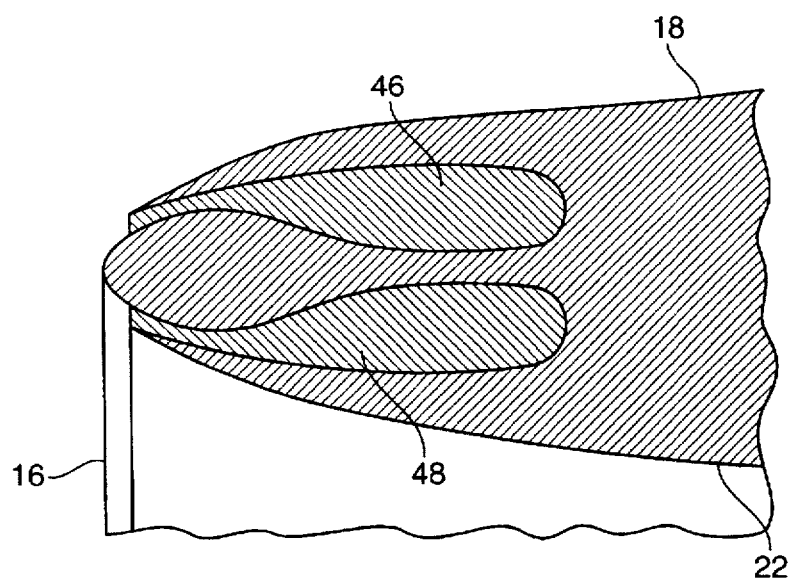
FIG. 4 is a partial section view taken substantially through a plane indicated by section line 4—4 in FIG. 2.

In the illustrated embodiment depicted in FIGS. 2 and 4, the radially outer and inner arrangements of channels 30 and 38 are respectively divided into four segments or quadrants separated by walls 46 and 48. The quadrants of such channels 30 and 38 are supplied with pressurized fluid, corresponding to that of the ambient medium 20, from a pressurizing source 50 through supply valves 52 under selective control of a control system 54 as diagrammed in FIG. 3. Thus, different combinations of inner and outer channel quadrants receive pressurized fluid for ejection from corresponding slots 32 and 40 in a selected circumferential sequence in order to obtain different supplemental propulsion control effects.

Figure 5A:
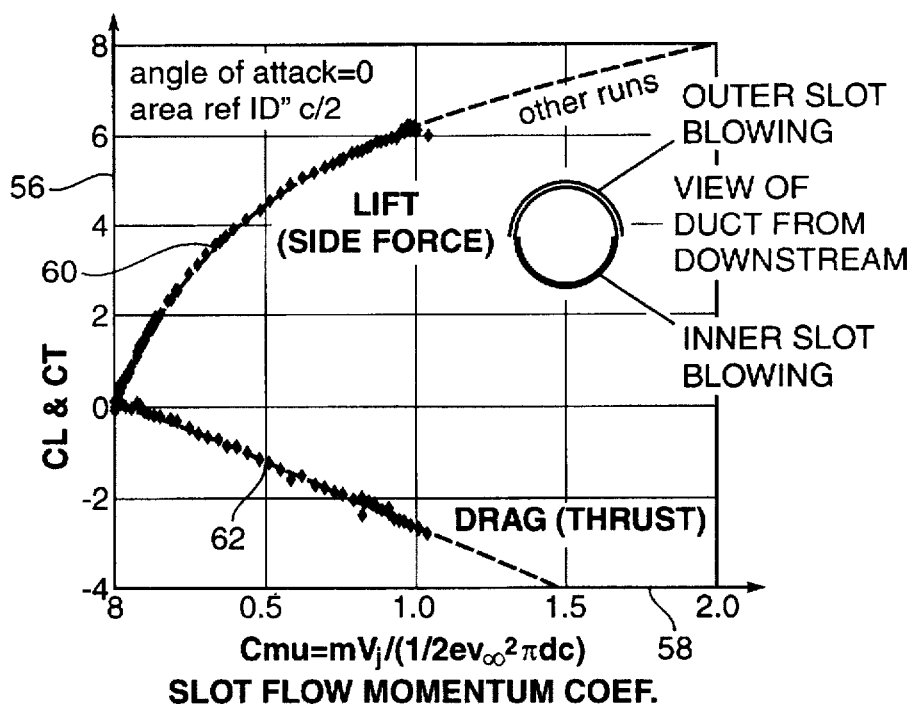
FIGS. 5A and 5B are graphs depicting certain control effects associated with the system depicted in FIGS. 1–4.
Figure 5B:
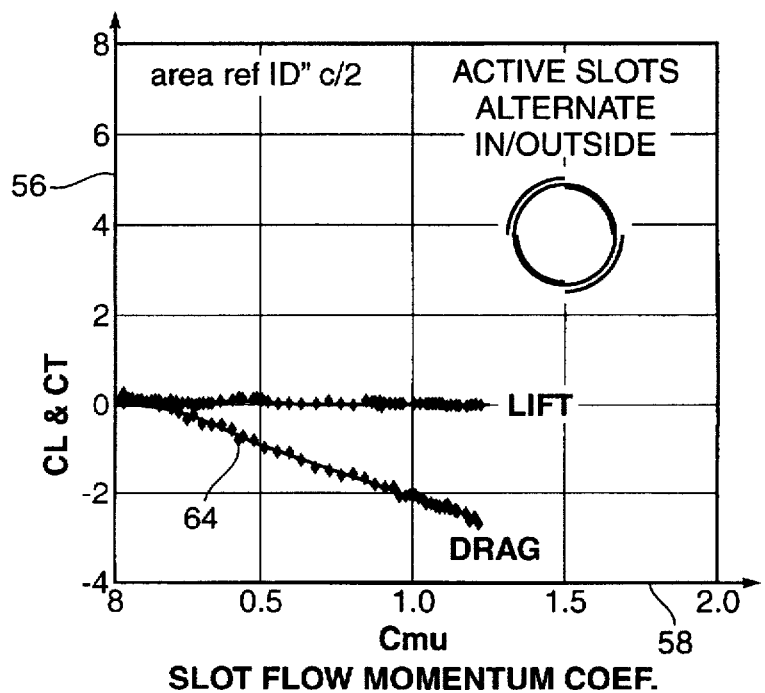

Side lift forces and thrust drag as examples of propulsion control effects are demonstrated by data obtained from wind tunnel tests of a duct model without a propeller, as graphically depicted in FIGS. 5A and 5B, wherein developed forces are plotted along an ordinate 56 varied as a function of slot ejection flow plotted as momentum level coefficients along an abscissa 58. As shown in FIG. 5A, with two of the upper quadrants of the outer channels 30 and two lower quadrants of the inner channels 38 being pressurized, the corresponding slot ejection flow produces an increasing side lift which acts as a steerage force depicted by curve 60 and a decreasing propulsion thrust or drag as depicted by curve 62. With an arrangement of circumferentially alternate quadrants of the inner and outer channels being pressurized, a decreasing thrust representing a braking force is obtained as depicted by curve 64 in FIG. 5B, with substantially no change in steerage force as represented by lift parameter (CL).

Pursuant to the present invention as hereinbefore described, lift induced drag is developed from a surface of the duct 10 in the absence of net lift and without deployment of mechanical elements to develop and control a braking drag force. Such braking force arises because of the strong vorticity passed into the wake of fluid flow from activated segments of outer slots 32 and inner slots 40 in response to a spatial switch over between activation of the inner and outer slots. The annular symmetry of the duct body 12 and such circumferential alteration between inner and outer slot activation cancels development of any lift. The net braking force so achieved is enhanced by the Coanda effect of formation 34 in reducing the required magnitude of flow momentum added by jet outflow from the slots 32 and 40.

Thus, the flow conditions at the trailing edge 16 of duct 10 are controllably modified by circumferential variation in location and selection of the Coanda affected outflow paths of the ejection jets tangential to the outer and inner surfaces 18 and 22 of the duct body 12 adjacent its trailing edge 16. Such ejection jets entrain and re-energize the boundary layer of the flow produced upstream along the duct surfaces 18 and 22 within boundary layer zones to modify the fluid dynamic symmetry of the annular duct and thereby provide the supplemental propulsion control effects as outlined in the following table:

| SLOT EJECTION CONFIGURATION | CONTROL EFFECT |
| --- | --- |
| inner slot only | Increased duct flow |
| outer slot only | decreased duct flow |
| complementary segments on a diagonal | yaw steerage pitch steerage |
| alternating | high drag caused braking |
| both slots | drag reduction supplemental thrust |

It will be apparent from the foregoing, that the present invention provides increased maneuverability for a marine vessel or aircraft without use of moving parts on the duct 10 by generating forces other than in the axial direction of the flow stream therethrough. Such forces are selectively applied in lateral and vertical directions as well as in directions for braking to enhance the thrust-vectoring capability of the associated propulsion system. Other applications of the present invention include diffusion control at the exit end of a pipe, chimney or other conduit outlets. For example, conduit stack gases may be widely diffused to reduce heat signature and concentration of pollutants by directional oscillation of exit gas deflection in response to flow rate control through the conduit via selection of inner or outer exit slot pressurization.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a vehicle propelled through a fluid medium by a propulsion system having a duct fixed to the vehicle through which flow of said fluid medium is conducted and means for modifying said flow of the fluid medium between forward and trailing edges of the duct, including: passage means fixedly mounted within said duct for ejection of pressurized fluid medium adjacent to and tangentially of said trailing edge of the duct from radially outer and inner flow channels formed within the duct; and control means for selective variation in angular extent of said ejection of the pressurized fluid medium; the improvement residing in: wall means formed internally within the duct for angularly separating the flow channels into angular segments to which the pressurized fluid medium is selectively supplied by the control means to effect said selective variation in angular extent of the ejection of the pressurized fluid medium; and Coanda formation means projecting from the trailing edge of the duct for separating spaced fluid ejection slots respectively extending from the inner and outer flow channels to establish outflow paths along which only said ejection of the pressurized fluid medium is directed.

2. The combination as defined in claim 1 wherein the propulsion system further includes flow accelerating means positioned within the duct.

3. In combination with a duct having an outlet end from which ejection of pressurized fluid modifies outflow of the fluid from the duct, the improvement residing in: radially inner and outer flow channels respectively connected to annular slots formed in the duct at said outlet end from which said ejection of the pressurized fluid occurs; a Coanda formation in the duct radially separating the inner and outer annular slots to establish intersecting outflow paths along which said ejection of the pressurized fluid is directed; wall means within said flow channels for partitioning thereof into angular segments to which the pressurized fluid is supplied; and control means operatively connected to the flow channels for selectively limiting said ejection of the pressurized fluid from different combinations of the angular segments to the annular slots from which only said ejection occurs along said outflow paths.

* * * * *